(No Model.)

S. BERGMANN.
CARBON HOLDER FOR ELECTRIC ARC LAMPS.

No. 501,758. Patented July 18, 1893.

Witnesses:
M. C. Pinckney
M. A. Cunningham

Inventor
Sigmund Bergmann
by Wm C. Behrend
Attorney

UNITED STATES PATENT OFFICE.

SIGMUND BERGMANN, OF NEW YORK, N. Y.

CARBON-HOLDER FOR ELECTRIC-ARC LAMPS.

SPECIFICATION forming part of Letters Patent No. 501,758, dated July 18, 1893.

Application filed March 20, 1893. Serial No. 466,795. (No model.)

*To all whom it may concern:*

Be it known that I, SIGMUND BERGMANN, a citizen of the United States, and a resident of New York city, New York, have invented a new and useful Improvement in Carbon-Holders for Electric-Arc Lamps, of which the following is a specification.

My invention relates to carbon holders for electric arc lamps.

The object of my invention is to render a carbon holder readily adjustable in any desired position and have it remain so during use; also to simplify its construction. I accomplish these objects by the means hereinafter described and claimed.

Figure 1:
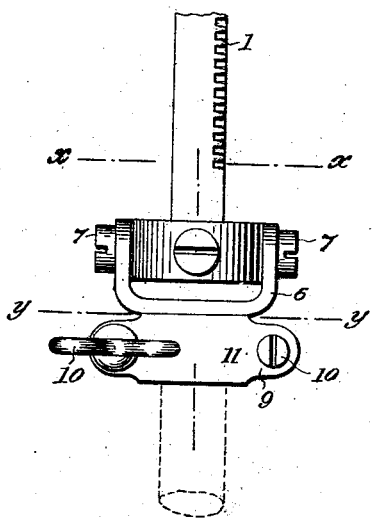
Figure 2:
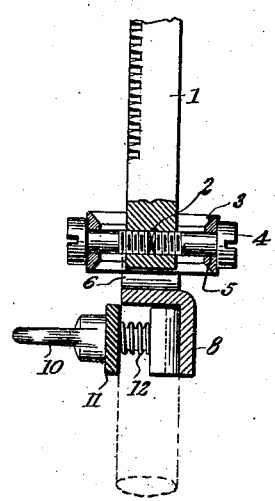
Figure 3:
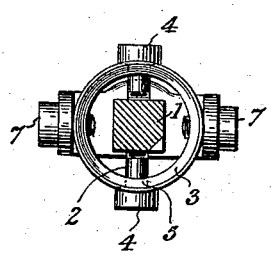
Figure 4:
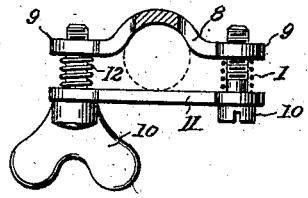

In the accompanying drawings forming a part of this specification, Figure 1 represents a side elevation of a carbon holder embodying my invention. Fig. 2 is a vertical cross-section of the same. Fig. 3 is a transverse cross-section on line $x\,x$ of Fig. 1, and Fig. 4 is a transverse cross-section on line $y\,y$ of the same figure.

Referring to the drawings, 1 represents the rack-bar of the arc lamp which is provided with a transverse screw threaded aperture 2 passing through the same as near as possible to its lower end. A metal ring 3 is secured to said rack-bar by two screws 4 which fit very closely in said screw-threaded aperture. The screws pass freely through openings 5 in the rings, the inner flanges of their heads bearing against the outer surface of the ring. The screws 4 fit so tightly in the rack bar that any movement of the ring does not disturb their relative positions to the rack bar. They are screwed in until the friction between their heads and the ring is sufficient to retain the latter in any adjusted position, while still permitting it to be moved by force of hand whenever necessary. The yoke 6 formed of bent metal is provided in each of its upturned ends or lugs with an aperture through which apertures screws 7 freely pass and screw tightly into the ring 3 at right angles to the screws securing the latter to the rack bar. The frictional contact between the lugs, the screws 7, and the ring is so regulated that the yoke will remain in any position to which it may be adjusted. The screws 4 when screwed into the bar slightly compress the ring which causes it to expand at right angles to its line of compression thus increasing the friction between itself and the said lugs.

The lower part of the yoke is provided with a downwardly bent part 8 shaped to act as a member of the carbon holder proper. This part 8 is provided with screw threaded lugs 9 at each side with which screws 10 engage. Said screws pass freely through a clamping bar 11 and are encompassed by spiral springs 12 as shown, the carbon rod, shown in dotted outlines, being held between the clamping bar and the downward extension of the yoke. But I lay no claim to the means for clamping the carbon in place and, therefore, further description of the same is unnecessary.

Having thus described my invention, what I claim, and desire to secure by Letters Patent, is—

1. In a carbon holder the combination with a rack bar, of a ring frictionally secured thereto, a yoke frictionally held to said ring, and a carbon holder clamping mechanism connected with said yoke, substantially as described.

2. In a carbon holder the combination with a rack bar, of a ring frictionally secured thereto, and a yoke frictionally held to said ring, said yoke having a downwardly bent portion shaped to act as a member of the carbon holder clamping means, substantially as described.

3. In a carbon holder the combination with a rack bar provided with a screw threaded perforation near its lower end, of a ring having transverse openings thereon, headed screws which freely pass through said openings and screw tightly into said rack bar, a yoke constructed to act as a member of the carbon rod clamping means, and provided with apertures in its upturned ends, and headed screws for securing the yoke to the ring, substantially as described.

4. In a carbon holder the combination with a rack bar provided with a screw threaded perforation near its lower end, of a ring having transverse openings therein, headed screws which freely pass through said openings and screw tightly into said rack bar, a yoke provided with a downwardly projecting portion as described acting as a member of the carbon rod clamping means, and provided with apertures in its upturned ends, and headed screws for securing the yoke to the ring, substantially as described.

In testimony that I claim the foregoing as my invention I have signed my name, in presence of two witnesses, this 17th day of March, 1893.

SIGMUND BERGMANN.

Witnesses:
I. WERTHEIMER,
LOUIS PH. GEYER.